Figure 1:
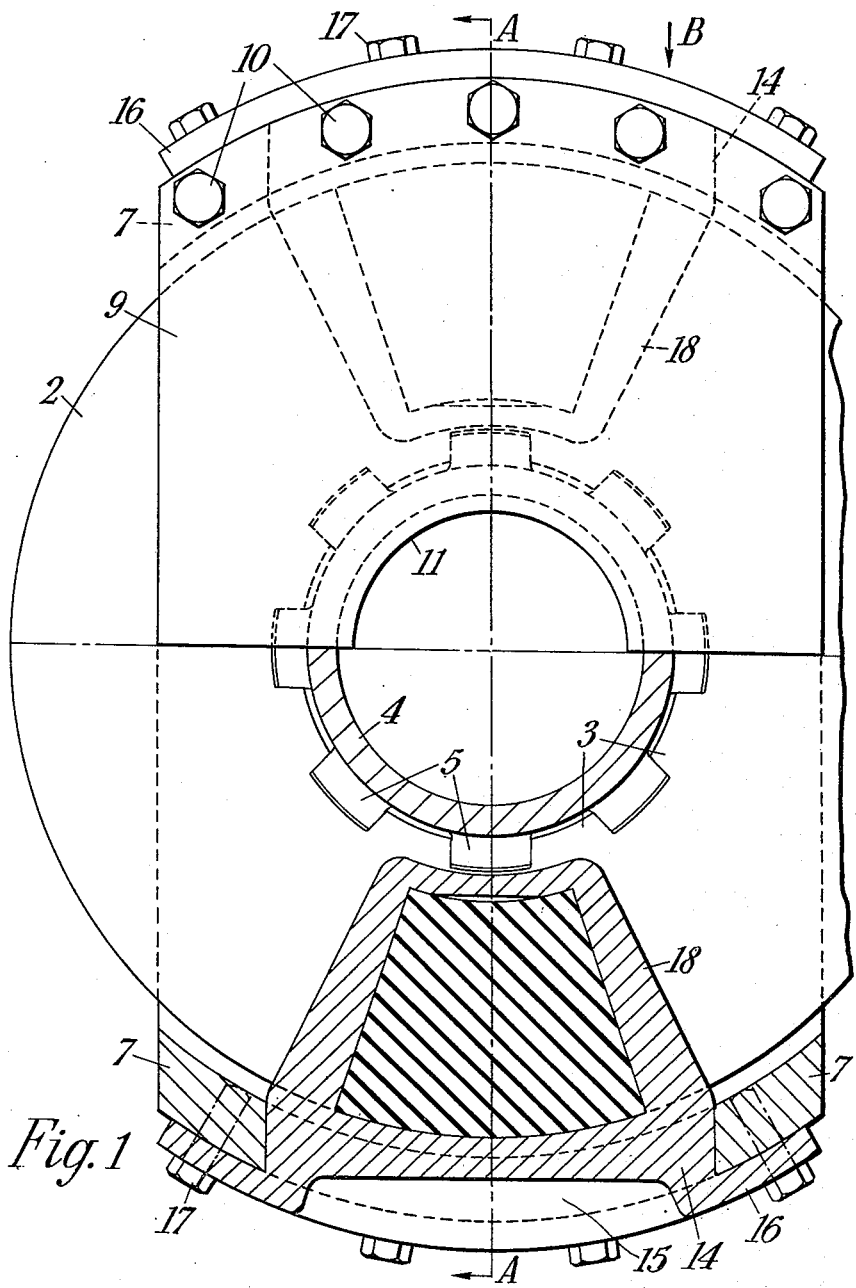

Sept. 11, 1956           H. J. BUTLER           2,762,460

DISC BRAKES FOR VEHICLES

Filed March 5, 1953                                     3 Sheets-Sheet 2

Henry James Butler
INVENTOR
by Benj. T. Rauber
his attorney

Sept. 11, 1956

H. J. BUTLER 2,762,460

DISC BRAKES FOR VEHICLES

Filed March 5, 1953

3 Sheets-Sheet 3

Henry James Butler
INVENTOR
by Benj T. Rauber
his attorney

United States Patent Office 2,762,460
Patented Sept. 11, 1956

2,762,460

DISC BRAKES FOR VEHICLES

Henry James Butler, Sutton Coldfield, England, assignor to Dunlop Rubber Company Limited, London, England, a British company Application March 5, 1953, Serial No. 340,575

Claims priority, application Great Britain March 6, 1952

5 Claims. (Cl. 188—72)

My invention relates to disc brakes for vehicles, and more particularly to disc brakes for commercial vehicles, track-laying vehicles, tanks and other heavy vehicles.

Commercial vehicles, track-laying vehicles and the like require large and powerful brakes which usually comprise a drum rotatable by a wheel or a driving shaft, non-rotatable brake shoes within the drum movable outwardly towards the inner wall of the drum under the action of a fluid pressure operated mechanism and linings of friction material secured to the shoes to frictionally engage said wall and thereby brake the drum and decelerate the vehicle. Such brakes, however, are not entirely satisfactory, one of the chief disadvantages being that the heat generated on braking can dissipate only very slowly. The brake thus rapidly heats up and brake fade sets in.

My present invention provides a brake for heavy vehicles which is efficient in operation, wherein brake fade does not so readily set in as in a conventional drum brake, and which is easy to dismantle and to maintain.

In my invention a fluid pressure operated disc brake for vehicles comprises a rotatable shaft, two or more brake discs axially slidable on and rotatable by the shaft, non-rotatable bridge-pieces extending axially adjacent the outer peripheries of said discs, a pair of transverse members connecting corresponding ends of the bridge-pieces, one on each side of the assembly of discs, axially-aligned pads of friction material secured to both ends of said transverse members each to frictionally engage one side of an adjacent disc, a non-rotatable guide-member located between each pair of adjacent discs and axially-aligned with said friction pads, a pair of friction pads axially slidable in each guide member to frictionally engage the adjacent sides of said discs and a fluid pressure operated mechanism located between each pair of slidable friction pads to effect frictional engagement between the pads and discs.

Preferably the brake comprises two rotatable discs, and one of the transverse members is an integral part of the vehicle structure, e. g. a steel plate which is an integral and rigid part of a tank structure. The bridge-pieces are bolted to said part and the other transverse member is bolted to the free ends of the bridge-piece, thus providing a rigid but easily-dismantled box structure surrounding the discs. Axially-aligned pads of friction material are secured to the transverse member adjacent its end and to an integral part of the vehicle structure each to frictionally engage one side of the adjacent disc. The guide members are detachably secured to each of the bridge-pieces between adjacent discs, and a pair of friction pads is axially slidable within each guide member to frictionally engage one of the adjacent sides of the two discs. A fluid pressure operated piston and cylinder mechanism is located between each pair of axially slidable discs to force the assembly of brake discs and friction pads together in fractional engagement.

Figure 2:
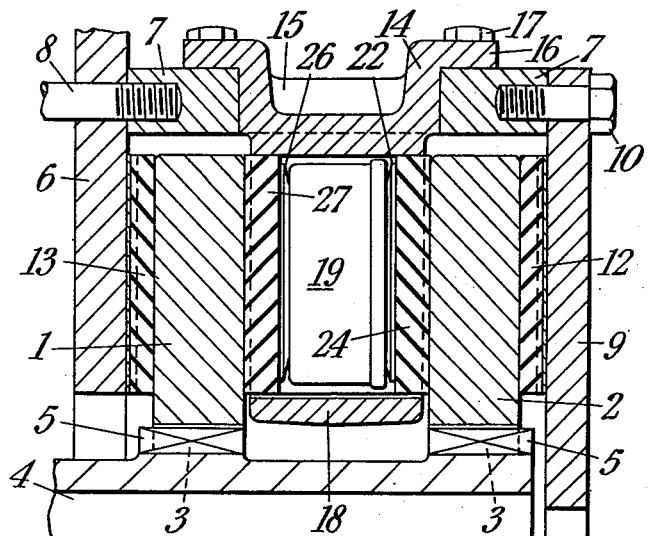
Figure 2:
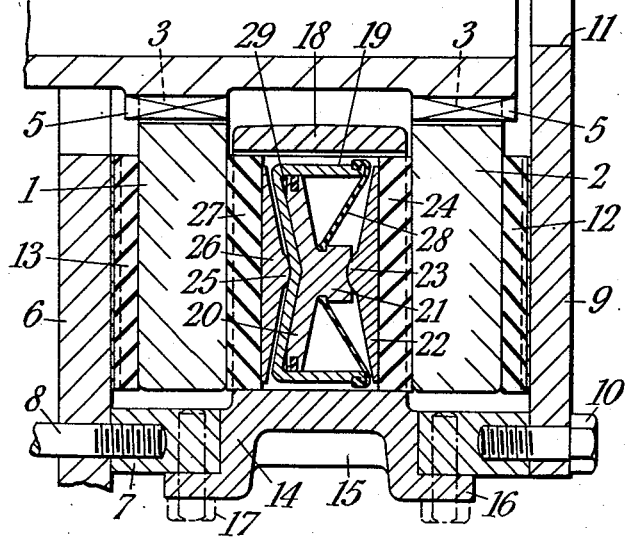
Figure 3:
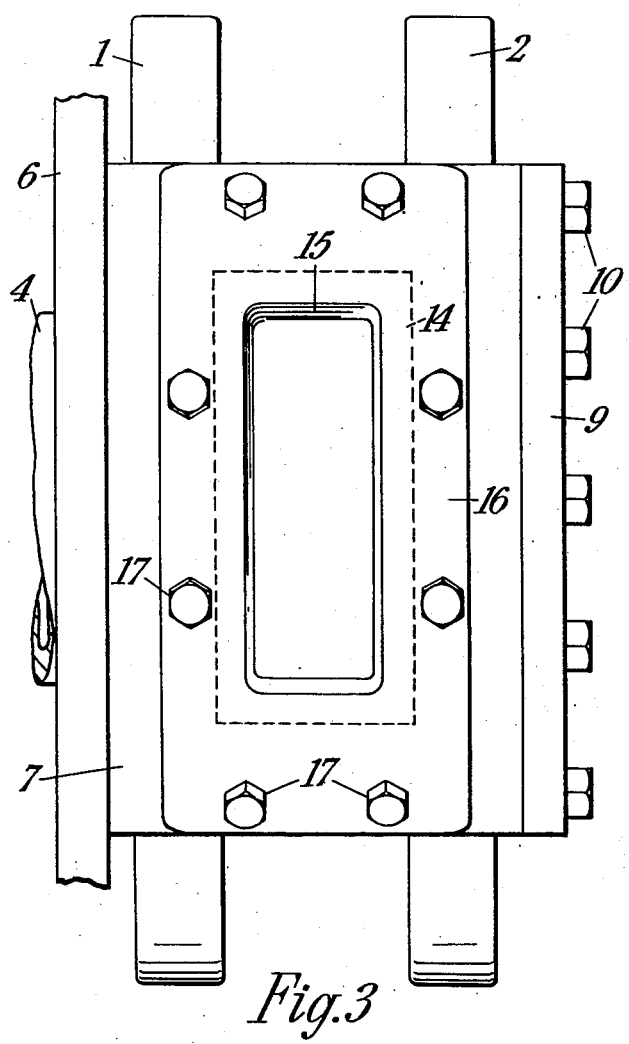

In order that the invention may be more readily described, reference is made to the accompanying drawings in which Figure 1 is a view, partly in section, of a tank brake constructed in accordance with the invention Figure 2 is a section through A—A of Figure 1, looking in the direction of the arrows and Figure 3 is a fragmentary view in the direction of arrow B of Figure 1.

The brake comprises a pair of identical axially-spaced discs 1 and 2 provided at their inner peripheries with a plurality of equispaced driving dogs 3. A shaft 4, driven by the engine of the tank, has one end provided with a plurality of axially-extending splines 5 and the annular discs are positioned on said end of the shaft. The dogs engage with the splines, the discs thus being rotatable by the shaft and axially slidable along the splines.

The disc 1 is situated adjacent to a steel plate 6 which is a rigid and integral part of the tank structure. Two diametrically-opposed bridge-pieces 7 extend axially from said plate adjacent the outer periphery of said discs. Each of said bridge-pieces is of rectangular form and is shaped in section to the curvature of the outer periphery of the discs, from which it is spaced by a short distance. Said bridge-pieces each extend over approximately one-quarter of the outer periphery of each disc and they are secured at one end to the plate 6 by bolts 8. The free ends of both bridge-pieces are connected together by a substantially rectangular beam 9 having one end secured to each of the free ends of the bridge-pieces by bolts 10. The beam is provided centrally with a hole 11.

The discs are thus rotatable within a rigid box-structure which is secured to the side of the tank. Diametrically-opposed arcuate pads of friction material 12 are secured to the beam 9 to frictionally engage the adjacent side of the disc 2 and similar pads of friction material 13, axially-aligned with the pads 12, are secured to the plate 6 to frictionally engage the adjacent side of the disc 1.

Each of the two bridge-pieces 7 is provided centrally with a rectangular hole extending radially therethrough and slidably fitting in each of said holes is a closure member 14 the outer side of which is provided with a recess 15 to lighten the assembly. The outer periphery of the closure member 14 is provided with an outwardly-extending flange 16 which is secured by bolts 17 to the associated bridge-piece. Dependent from the inner side of the closure member and integral therewith is a segmental guide member 18 which extends radially inwardly from the bridge-piece to a location adjacent the inner periphery of the discs. Said guide-member is provided with a substantially segmental shaped hole extending axially therethrough.

An open-ended cylinder 19 is positioned centrally within the hole in each guide-member, the axis of said cylinder being parallel to that of the discs and shaft. A piston 20 is slidably and fluid-tightly fitted in said cylinder, said piston being provided integrally with a stem 21 having a part-spherical depression in the end thereof. A backing plate 22 has a complementary projection 23 rockably seated in said depression and the side of said plate remote from the projection is planar and abuts a segmental pad 24 of friction material which is axially slidable in one end of the hole in the guide member and is adapted to frictionally engage the inner radially-extending surface of the adjacent disc 2.

The base of the cylinder 19 on the side remote from the piston is provided centrally with a depression and seated therein is a projection 25 of a backing plate 26 which is identical with the backing plate 22 hereinabove described. Abutting the planar face of said plate is a segmental pad 27 of friction material axially slidable in the other end of the hole through the guide member to frictionally engage the inner radially-extending surface of the adjacent disc 1. A flexible annular diaphragm 28 has the outer periphery secured to the open end of the cylinder 19 and the inner periphery secured to the piston stem 21 to prevent dirt, moisture and the like from fouling the cylinder walls. An annular gap 29 is provided between the piston and the base of the cylinder, and this gap is connected, through flexible pipes (not illustrated), with a source of fluid pressure under the control of the driver of the tank.

The discs 1 and 2 rotate with the driving shaft 4. The remainder of the brake assembly is non-rotatable. On applying braking pressure, as by operating a master-cylinder or the like, to the annular gap 29 between the piston and the base of the cylinder, the piston and said base are forced mutually apart, and this force, acting through the backing plates 22 and 26, moves the slidable pads of friction material into rubbing engagement with the adjacent sides of the two discs 1 and 2. The discs are thus caused to move axially along the splines of the driving shaft 4 until they are in rubbing contact with the friction pads 12 and 13. The rotating discs are thus nipped between the non-rotating pads of friction material, and the discs and hence the driving shaft is decelerated, and the tank is braked.

The diametrically-opposed friction pads occupy a relatively small proportion only of the braking surfaces of the discs, which consequently run at a much lower temperature than a drum, under comparable conditions. To assist cooling, a stream of compressed air may be played on the parts of the disc projecting exteriorly of the box-structure.

A brake of this type has few working parts, and is easy to service and maintain. It is efficient in operation and, since it does not heat up so easily as a comparable drum brake, it is not so liable to brake fade. A feature of the invention is the provision of means whereby the brake-operating mechanism may be easily withdrawn for examination and maintenance. By removing the bolts 17 the closure members 14 and guide member 18 together with their associate piston and cylinder mechanisms, backing plates and friction pads can be completely withdrawn from the brake assembly. On removing the beam 9 both discs can be removed for examination, whilst the remaining friction pads 12 and 13 are also accessible.

Whilst the brake of the present invention has been described as applied to a tank, it is not restricted to use with a vehicle of this nature. For example, with minor modification it may be made applicable to heavy road vehicles, rolling stock and the like.

Having now described my invention what I claim is:

1. A fluid pressure operated disc brake for vehicles comprising a rotatable shaft, a pair of annular brake discs axially slidable on and rotatable by the shaft, a pair of non-rotatable bridge pieces extending axially adjacent the outer periphery of said discs, one at each end of a diameter thereof, a pair of transverse member connecting corresponding ends of the bridge pieces, one on each side of the pair of discs, axially-aligned friction pads secured to said transverse members one near each end of its transverse member, each to frictionally engage one side of an adjacent disc, a guide-member secured to each bridge-piece and extending inwardly therefrom between said pair of discs, a pair of friction pads mounted in and axially slidable relative to each guide member to frictionally engage adjacent sides of said discs and a fluid pressure operated mechanism comprising a pair of co-operating members each axially movable relative to the other and located between each pair of slidable friction pads to effect frictional engagement between the pads and discs.

2. A fluid pressure operated disc brake according to claim 1 wherein each of said pair of axially slidable pads is provided with a backing plate, each plate being provided with a pivotal connection to one of the two relatively movable parts of said fluid pressure operated mechanism.

3. A fluid pressure operated mechanism according to claim 2 wherein said fluid pressure operated mechanism comprises a piston and cylinder mechanism.

4. The fluid pressure operated disc brake of claim 1 in which at least one of said bridge-pieces has an opening and in which a guide member extends through said opening and has a flange detachably secured against the outer face of said bridge-piece.

5. The fluid pressure operated disc of claim 4 in which said guide member has a guide passage extending axially therethrough.

References Cited in the file of this patent

UNITED STATES PATENTS

| | | |
|---|---|---|
| 1,875,095 | Milan | Aug. 30, 1932 |
| 2,006,387 | Eksergian | July 2, 1935 |
| 2,159,326 | Harwood et al. | May 23, 1939 |
| 2,174,635 | Linderman | Oct. 3, 1939 |
| 2,199,785 | Dickson | May 7, 1940 |
| 2,251,539 | Ash | Aug. 5, 1941 |
| 2,596,556 | Hollerith | May 13, 1952 |